Aug. 27, 1929.  W. A. MOIR  1,726,189
SPRINGING SYSTEM OF MOTOR ROAD VEHICLES
Filed Sept. 21, 1927  2 Sheets-Sheet 2
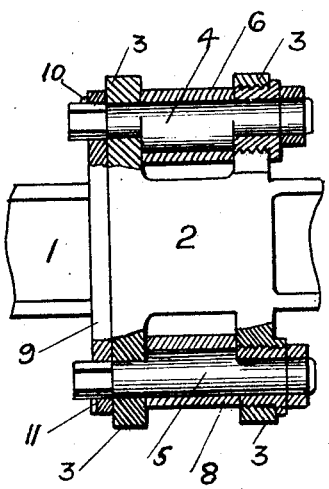
- Fig. 4 -
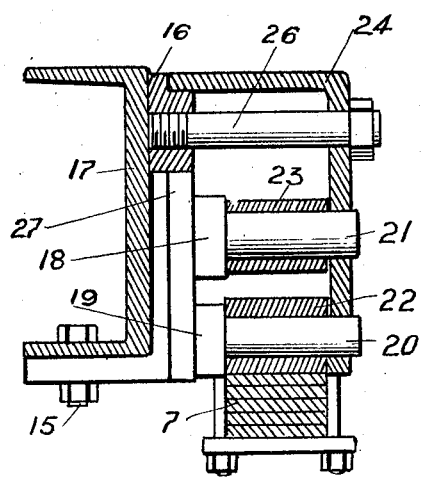
- Fig. 5 -
Inventor
William Alexander Moir
Fetherstonhaugh & Co
Attys.

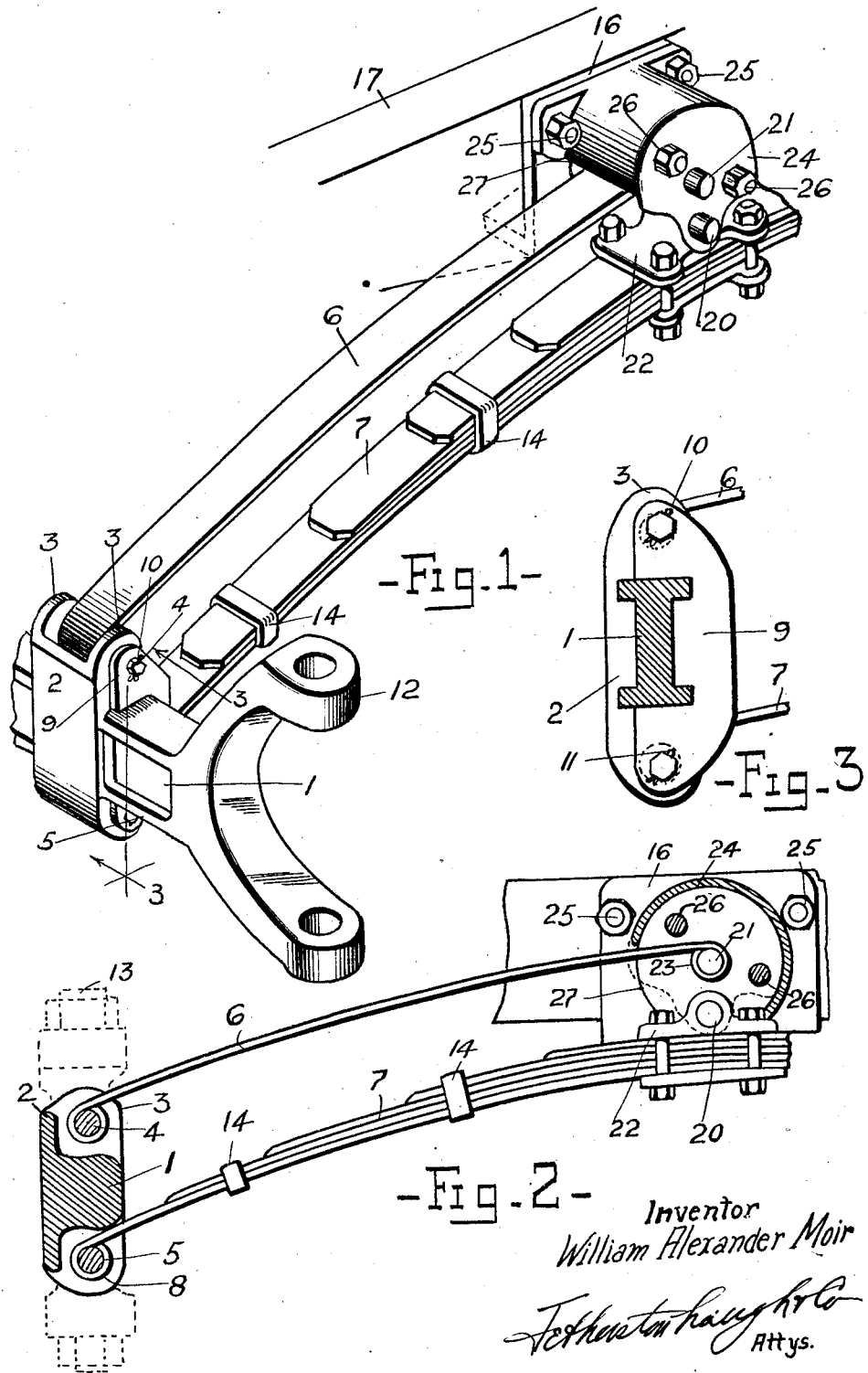

Patented Aug. 27, 1929.

1,726,189

UNITED STATES PATENT OFFICE.

WILLIAM ALEXANDER MOIR, OF BURWOOD, NEAR SYDNEY, NEW SOUTH WALES, AUSTRALIA.

SPRINGING SYSTEM OF MOTOR ROAD VEHICLES.

Application filed September 21, 1927. Serial No. 221,049.

This invention relates to improvements in springing systems of motor-road vehicles for use in cases where front wheel brakes are incorporated with the front axle and also for use in connection with the rear axle or its casing if required.

The stresses imposed on certain types of front suspension springs are such that front wheel brakes cannot be fitted with safety, and this is so particularly when springs are used whose forward ends are bolted directly to the front axle and not to the dumb irons of the chasses frame members as ordinarily known. It is also very necessary that the king pins on which the stub axles swivel should be kept at a proper angle in relation to the tread of the road wheels in order that the steering gear will function with best results.

Certain objects of this invention are to provide means for minimizing stresses on the front suspension springs, particularly springs of the cantilever and quarter elliptic types; to furnish means whereby proper functioning of the steering gear will be ensured and accidents thus minimized; and to provide adjustment means for the angularity of the king pins of the stub axles should the original camber of the suspension springs or of torque members utilized in connection with the invention alter and assume a permanent set.

Referring to the accompanying drawings, Fig. 1 is a perspective view showing the invention applied to a front axle of a motor-road vehicle; Fig. 2 side elevation partly in section; Fig. 3 cross-sectional elevation on plane 3—3, Fig. 1; Fig. 4 elevation of the bracket members partly in section on the front axle; Fig. 5 cross-sectional elevation of anchoring means attachable to the vehicle body or frame.

With reference to Figs. 1 to 5, the front axle 1 may have preferably formed integral therewith at opposite ends thereof brackets 2 with cheeks 3 having bearings therein for the opposite ends of adjustable eccentric pins 4 and 5 disposed horizontally of such cheeks 3. A torque spring member 6 which may consist of a single leaf or a plurality of leaves has an eye at one end which receives the eccentric pin 4; similarly the forward end of the quarter elliptic suspension springs 7 or other suitable springs have an eye 8 which is adapted to receive the eccentric pin 5. One end of each of such pins 4 and 5 is formed hexagonally or otherwise to prevent them from turning in the removable keeper plates 9 which fit about the axle 1 at one side of the brackets 2; said keeper plates are holed to receive the formed ends of the pins 4 and 5. The formed ends of the pins 4 and 5 may also have an opening therein to receive the split pins 10 and 11 which serve to secure the keeper plates 9 in position. The axle 1 has usual forked ends 12 for the king pins 13 of the stub axles. Any usual clamp 14 may be utilized to secure the leaves of the suspension springs 7.

Secured to the chassis members 17 or body of the vehicle by bolts 15 are brackets 16; such brackets may have bosses 18 and 19 for projecting pins 20 and 21 which are fixed to said brackets. To the pins 20 are pivoted the members 22 of usual clamping elements for the suspension springs 7. The other pins 21 are adapted to fit eyes 23 at the rear end of the torque spring member 6. The outer ends of both pins 20 and 21 project through removable casings 24 which are securable to the brackets 16 by the bolts 25 and through bolts 26 furnished with securing nuts abutting the outer end of the casings 24. The brackets 16 may be provided with a spigot 27 to fit the inner end of the casings 24.

It is well known that when front wheel brakes are applied the front axle tends to rotate owing to the momentum of the vehicle, with the result that the springs are very liable to break near their forward tips, where they are least adapted to take undue strains. Through such turning of the front axle the steering mechanism of the vehicle is also likely to be seriously affected and persons thereby exposed to danger. By the means provided by the invention these defects are obviated or greatly lessened. The eccentric pins 4 and 5 may be adjusted at will for the purpose of adjusting the spring members 6 and 7 with the object of giving proper setting to the king pins 13 with regard to the road wheels of the vehicle. The camber of the springs 6 and 7 may alter and take a permanent set under service conditions of the vehicles and this would be likely to affect the steering gear as the angular setting of the king pins 13 with regard to the road wheels would thus be altered. Any material alteration in the length of the springs 6 and 7 during wear may be compensated by the adjustment of the eccentric pins 4 and 5 and the locking thereof in proper position by the keeper plates 9.

Having now fully described and ascertained my said invention and the manner in which it is to be performed, I declare that what I claim is:—

1. Springing means for motor road vehicles comprising a torque spring member one end of which is attached to an adjustable eccentric pin on a fixed element on the axle of the vehicle and the other end of which is attached to a member rigidly fixed to the chassis frame or body of the vehicle, a suspension spring one end of which is attached to an adjustable eccentric pin on said fixed element said suspension spring being also attached to the member rigidly fixed to the said chassis frame or body of the vehicle, and means for locking said eccentric pins from turning after adjustment thereof.

2. Springing means for motor road vehicles according to claim 1, in which the fixed element on the axle consists of a bracket on the axle holed to receive the eccentric pins, and the means for locking said pins consisting of a keeper plate holed to prevent rotation of said pins when set by said plate, the latter being adapted to fit about the axle and to be retained in position in relation thereto and to said bracket.

3. Springing means for motor road vehicles according to claim 1, in which the rigidly fixed member on the vehicle consists of a bracket, a pair of projecting pins fixed to the bracket, said pins being respectively connected to the torque member and the suspension spring, and a cover detachably affixed to said bracket over the connection between the torque member and the suspension spring with the said pins.

4. Springing means for motor road vehicles comprising a torque spring and a suspension spring extending forwardly from points of attachment to the chassis of the vehicle and connections securing the forward terminals of said springs to upper and lower portions of the front axle, said connections being adjustable as and for the purpose described.

Dated this 24th day of Aug. A. D. 1927.

WILLIAM ALEXANDER MOIR.